(12) United States Patent
Athani et al.

(10) Patent No.: US 11,901,712 B1
(45) Date of Patent: Feb. 13, 2024

(54) PANEL MOUNTED POWER-CABLE SYSTEM FOR AN APPLIANCE

(71) Applicant: WHIRLPOOL CORPORATION, Benton Harbor, MI (US)

(72) Inventors: Murgyappa Mahadev Athani, Maharashtra (IN); Lingaraj I. Bandiwad, Savanur (IN); Jakub Buczkowski, Kielczow (PL); Varun D. Kuvalekar, Stevensville, MI (US); Rafal Serniak, Zmigrod (PL); Shaikh Meejanali Shoukatali, Maharashtra (IN); Scott Patrick Kokoska, South Bend, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/134,390

(22) Filed: Apr. 13, 2023

(51) Int. Cl.
*H02G 15/16* (2006.01)
*H01R 13/74* (2006.01)
*H01R 31/06* (2006.01)
*H01R 13/05* (2006.01)

(52) U.S. Cl.
CPC .......... *H02G 15/16* (2013.01); *H01R 13/055* (2013.01); *H01R 13/748* (2013.01); *H01R 31/06* (2013.01)

(58) Field of Classification Search
CPC ....... H01R 31/06; H01R 13/748; H02G 15/16
See application file for complete search history.

(56) References Cited

U.S. PATENT DOCUMENTS

| 4,900,270 | A  | * | 2/1990 | Edwards | ............... | H01R 31/06 439/502 |
| 6,200,155 | B1 | * | 3/2001 | Chudkosky | ............ | H01R 31/06 174/53 |
| 6,536,333 | B2 |   | 3/2003 | Bouly et al. | | |
| 8,460,016 | B2 |   | 6/2013 | Liu | | |
| 9,455,542 | B2 | * | 9/2016 | Gaither | ................ | H01R 31/06 |
| 10,439,343 | B2 |  | 10/2019 | Sakal | | |
| 2008/0164224 | A1 | * | 7/2008 | McCoy | ................ | H01R 31/06 211/26.1 |

(Continued)

FOREIGN PATENT DOCUMENTS

| CN | 201546075 U | 8/2010 |
| CN | 204177062 U | 2/2015 |

(Continued)

*Primary Examiner* — Hung V Ngo
(74) *Attorney, Agent, or Firm* — Price Heneveld LLP (57) ABSTRACT

An appliance includes a cabinet with a rear panel. The rear panel defines a recessed portion with an offset surface and an aperture defined on the offset surface. A power connector is disposed in the aperture. The power connector includes a cable engagement section configured to engage a power cable and a source engagement section opposing the cable engagement section. The source engagement section extends through the rear panel to engage a power receiver within the cabinet. A mounting flange is disposed between the cable engagement section and the source engagement section and operably couples to the offset surface. A cover is coupled to the rear panel over the recessed portion. The cover includes an outer rim and a body protruding outward from the outer rim. An opening is defined between a bottom section of the body and the rear panel through which the power cable is configured to extend.

20 Claims, 9 Drawing Sheets

(56) References Cited

U.S. PATENT DOCUMENTS

| | | | |
|---|---|---|---|
| 2009/0064702 A1 | 3/2009 | Cook et al. | |
| 2012/0220148 A1* | 8/2012 | Walls, Jr. | H01R 31/06 439/218 |
| 2012/0220167 A1* | 8/2012 | Walls, Jr. | H01R 31/06 439/638 |
| 2018/0149421 A1 | 5/2018 | Ciyanoglu et al. | |
| 2020/0076143 A1* | 3/2020 | Reese | H01R 25/006 |

FOREIGN PATENT DOCUMENTS

| | | |
|---|---|---|
| DE | 102006049402 A1 | 4/2008 |
| DE | 102009032475 A1 | 1/2011 |
| EP | 2556783 B1 | 10/2017 |
| WO | 2016134933 A1 | 9/2016 |
| WO | 2018095206 A1 | 5/2018 |
| WO | 2019129408 A1 | 7/2019 |

\* cited by examiner

PANEL MOUNTED POWER-CABLE SYSTEM FOR AN APPLIANCE

BACKGROUND OF THE DISCLOSURE

The present disclosure generally relates to a power-cord feature, and more specifically, to a panel mounted power-cord feature for an appliance.

SUMMARY OF THE DISCLOSURE

According to one aspect of the present disclosure, a household appliance includes a cabinet with a rear panel. The rear panel defines a recessed portion that has an offset surface and an aperture defined by the offset surface. A power connector is disposed in the aperture. The power connector includes a cable engagement section that is configured to engage a power cable. A source engagement section opposes the cable engagement section. The source engagement section extends through the rear panel to engage a power receiver within the cabinet. A mounting flange is disposed between the cable engagement section and the source engagement section. The mounting flange operably couples to the offset surface. A cover is coupled to the rear panel over the recessed portion. The cover includes an outer rim and a body protruding from the outer rim. An opening is defined between a bottom section of the body and the rear panel and permits extension of the power cable through the opening. A gasket is disposed between the rear panel and the cover. The gasket extends along at least a portion of an outer periphery of the recessed portion.

According to another aspect of the present disclosure, an appliance includes a cabinet with a rear panel. The rear panel defines a recessed portion with an aperture in the recessed portion. A protruding lip extends along at least a portion of an outer periphery of the recessed portion. A power connector is disposed in the aperture. The power connector includes a cable engagement section configured to selectively engage a power cable. A source engagement section opposes the cable engagement section. The source engagement section extends through the rear panel to engage a power receiver within the cabinet. A mounting flange is disposed between the cable engagement section and the source engagement section. The mounting flange operably couples to an offset surface of the recessed portion. A cover is coupled to the rear panel over the recessed portion. The cover has an inner surface that defines a channel. The protruding lip is disposed within the channel to provide a sealed interface between the cover and the rear panel.

According to yet another aspect of the present disclosure, an appliance includes a cabinet panel. The cabinet panel defines a recessed portion and an aperture in the recessed portion. A power connector is disposed in the aperture. The power connector includes a cable engagement section that is configured to engage a power cable. A source engagement section opposes the cable engagement section. The source engagement section extends through the cabinet panel to engage a power receiver within the cabinet. A mounting flange is disposed between the cable engagement section and the source engagement section. The mounting flange is operably coupled to an offset surface of the recessed portion. A cover is coupled to the rear panel over the recessed portion.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to a panel mounted power-cable system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
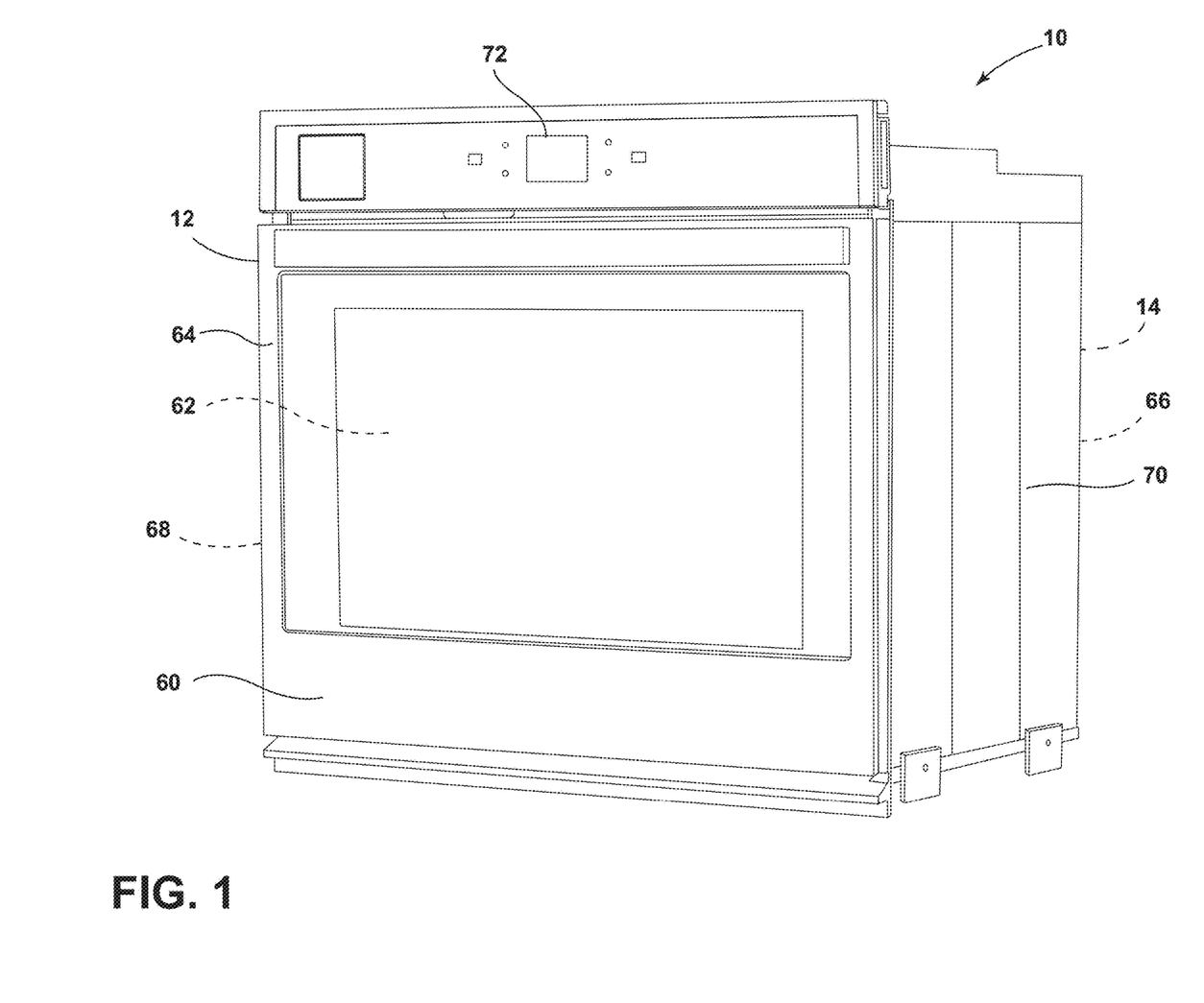
FIG. 1 is a front perspective view of an appliance, according to the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-9, reference numeral 10 designates an appliance, such as an oven, refrigeration unit, or a dishwasher. The appliance 10 includes a cabinet 12 with a rear panel 14. The rear panel 14 defines a recessed portion 16 with an offset surface 18 and a first aperture 20 defined by the offset surface 18. A power connector 22 is disposed in the first aperture 20. The power connector 22 includes a cable engagement section 24 that is configured to engage a power cable 26. A source engagement section 28 opposes the cable engagement section 24. The source engagement section 28 extends through the rear panel 14 to engage a power receiver that is disposed within the cabinet 12. A mounting flange 30 is disposed between the cable engagement section 24 and the source engagement section 28. The mounting flange 30 operably couples to the offset surface 18. A cover 32 is coupled to the rear panel 14 over the recessed portion 16. The cover 32 includes an outer rim 34 and a body 36 protruding outward from the outer rim 34. An opening 38 is defined between a bottom section 40 of the body 36 and the rear panel 14 through which the power cable 26 is configured to extend. A gasket 42 is disposed between the rear panel 14 and the cover 32. The gasket 42 extends along at least a portion of an outer periphery of the recessed portion 16.

Figure 2:
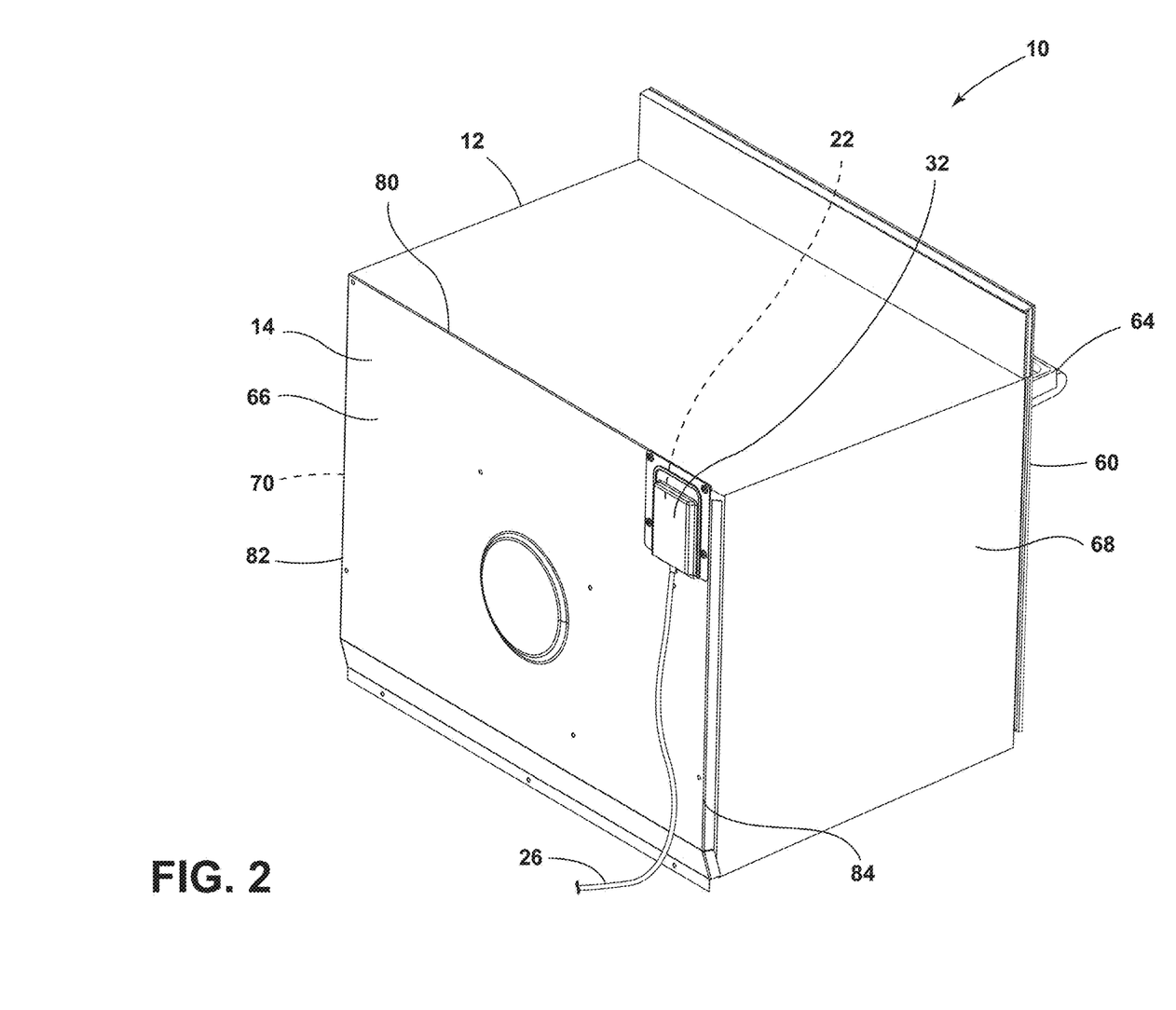
FIG. 2 is a rear perspective view of an appliance with a cover coupled to the rear panel, according to the present disclosure.

Referring to FIGS. 1 and 2, in the illustrated example, the cabinet 12 of the appliance 10 includes a front portion 60 that defines a cooking cavity 62 that is operably closed by a door assembly 64 and a rear portion 66, which opposes the front portion 60. As illustrated in FIG. 2, the rear portion 66 includes the rear panel 14 extending across a width and height of the rear portion 66. A first side portion 68 is defined between the front portion 60 and the rear portion 66. A second side portion 70 opposes the first side portion 68. A heating element is disposed within the cabinet 12 and may be operably powered via electricity. In various examples, the electricity can be provided to the heating element from an external power source and the power cable 26, which is in electrical communication with the external power source. The power cable 26 couples with the power connector 22. The power connector 22 can then operably couple to one or more power receivers in electrical communication with the heating element and provide electricity to the heating element.

The electric current provided to the household appliance 10 may have various voltages (e.g., 120V, 220V, or 240V), and may have varying frequencies (e.g., 50 Hz or 60 Hz). It is also generally contemplated that the electricity provided to the household appliance 10 may power various other components and systems. For example, the electricity may be used to power a user interface 72 or one or more lighting elements, indicators, sound features, video features, and/or various other components of the household appliance 10.

In certain aspects where a traditional appliance is configured with an electric heating element, the electricity is provided to the traditional appliance via one or more power cords that are connected to an external power source and routed through a housing assembly and into an interior of the traditional appliance, where the power cord is connected, via a wire to wire connection, to another cord within the traditional appliance that is then connected to the heating element. In aspects where the power cord is routed into the interior of the traditional appliance and connected to another cord, it can be difficult to install, remove, or replace the power cord, such as during transit or if the power cord is damaged, as a user would be required to at least remove one or more panels and partially disassemble the housing assembly to access and replace the power cord.

To increase accessibility and efficiency of installation, removal, or replacement of the power cable 26 to or from the appliance 10, the appliance 10 disclosed herein may incorporate the recessed portion 16, the cover 32 disposed over the recessed portion 16, and the power connector 22 housed within the recessed portion 16 and the cover 32 to ensure that the power cable 26 may be efficiently installed or removed without removing a panel or partially disassembling the appliance 10.

While the appliance 10 is illustrated herein as an oven, the panel 14, the cover 32, and the power connector 22 may be included in any practicable configuration of household appliances 10 and/or commercial appliances 10 without departing from the teachings herein. The appliance 10 may be, for example, but not limited to, an oven, an oven range, a refrigeration unit, a freezer, a dishwasher, a countertop appliance, a laundry appliance, etc. Moreover, while the panel 14 is illustrated and generally described herein as the rear panel 14, depending on the configuration of the appliance 10, the panel 14, may be any cabinet panel of the appliance 10 for providing electrical communication between the appliance 10 and the external power source.

Referring now to FIGS. 2-8, the appliance 10 includes a panel-mounted power cable system for selectively coupling and removing the power cable 26 from the appliance 10. Accordingly, the power cable 26 may be coupled to the power connector 22 and an external power source to provide power to the appliance 10 and selectively removed from the appliance 10, such as for shipping or replacement of the power cord 26. Further, the panel-mounted system disclosed herein may provide interchangeable components for multiple types of appliances 10.

Figure 4:
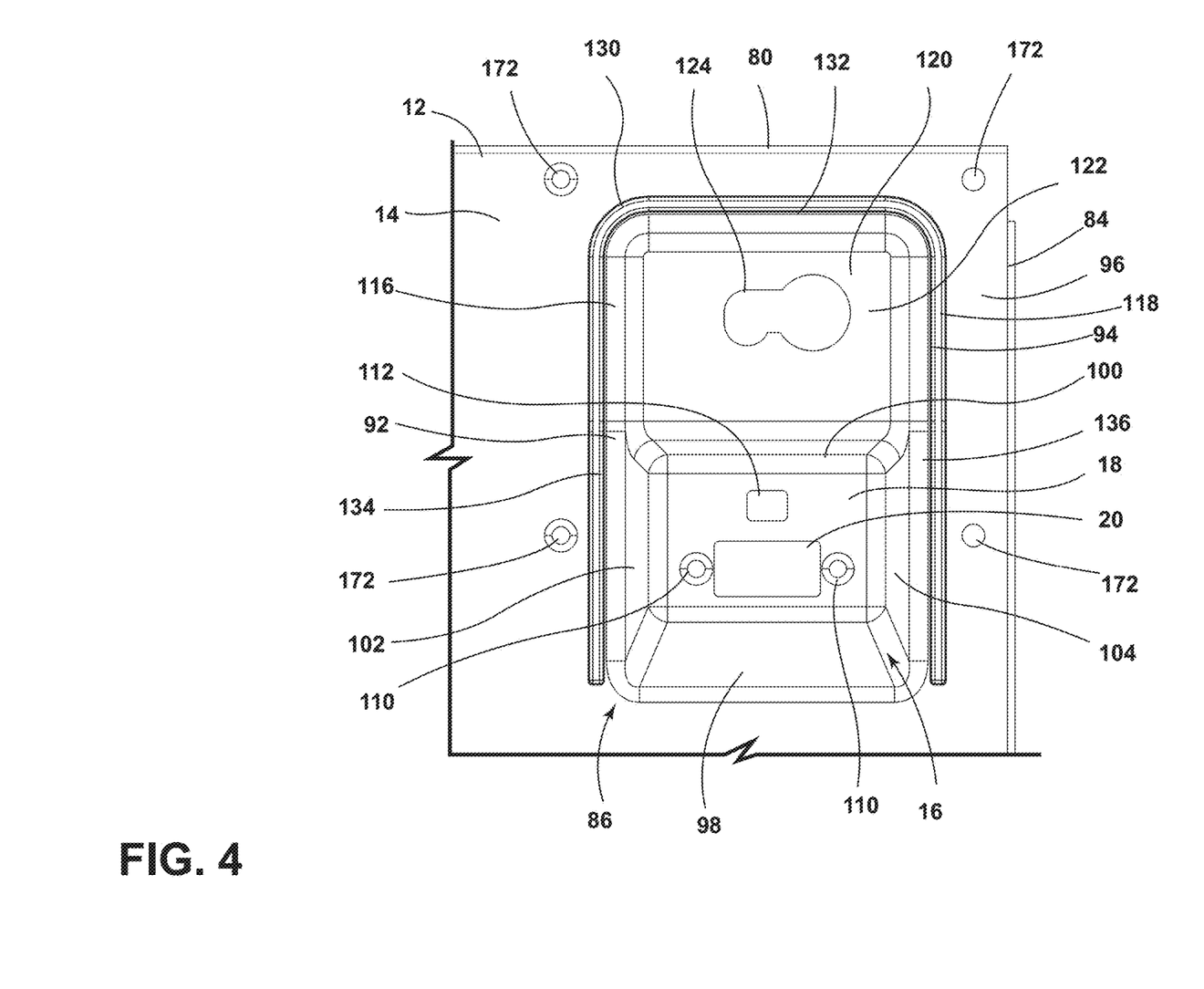
FIG. 4 is a partial enlarged, rear elevational view of a rear panel of an appliance with a recessed portion having a first section and a second section, and a lip extending around the recessed portion, according to the present disclosure.
Figure 5:
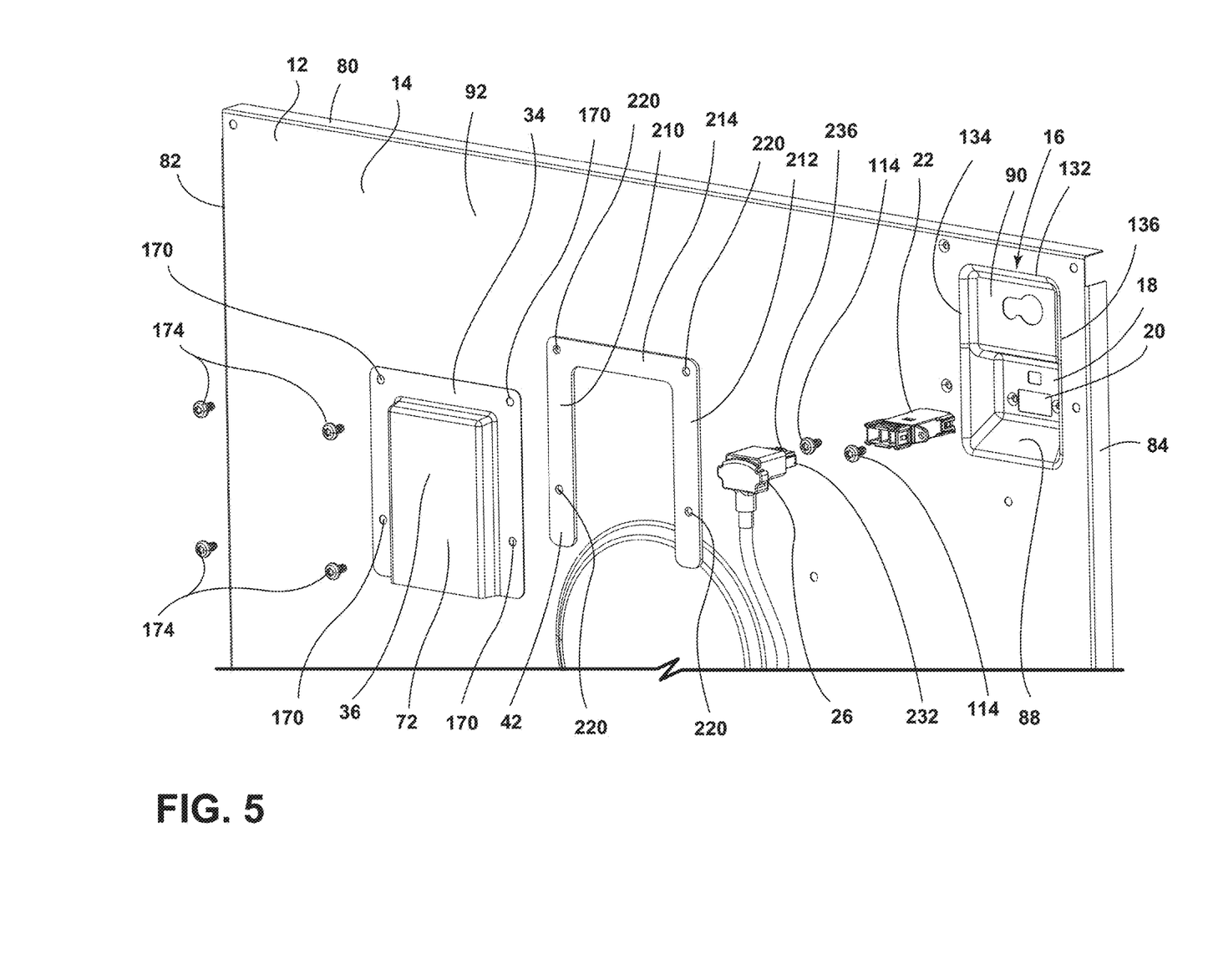
FIG. 5 is a partial rear perspective, exploded view of a rear panel of an appliance with a recessed portion defined by the rear panel, a power connector configured to be disposed in the recessed portion, a cover, and a gasket, according to the present disclosure.

The panel-mounted system generally includes the rear panel 14 of the cabinet 12, which defines the recessed portion 16. The recessed portion 16 can be defined in various locations along the rear panel 14. For example, the recessed portion 16 can be defined near a top section 80 and/or side sections 82, 84 of the rear panel 14. As illustrated in FIGS. 4 and 5, the recessed portion 16 extends into the cabinet 12 and towards the front portion 60. The depth of recession of the recessed portion 16 can coincide with various aspects, such as a size of the power connector 22, distance to the heating element, or various other factors. It is also generally contemplated that the recessed portion 16 may define various sections of varying depths, as provided herein.

Referring to FIGS. 3-6, the recessed portion 16 includes a first section 88 and a second section 90 proximate to the first section 88. In various examples, the second section 90 can be generally appliance-upward of the first section 88 and closer to the top section 80 of the rear panel 14 than the first section 88. The first section 88 can be recessed to varying depths relative to the second section 90. For example, the first section 88 can have a greater depth of recession relative to the rear panel 14 than the second section 90, as illustrated in FIGS. 4 and 5. In other examples, opposing side surfaces 92, 94 are defined along opposing sides of the recessed portion 16. The opposing side surfaces 92, 94 may define various regions of various depths, as provided herein. For example, each opposing side surface 92, 94 may extend from an outer surface 96 of the rear panel 14 and towards offset surface 18 in the first section 88 or the second section 90 at various depths. While illustrated as having two sections 88, 90 of different depths, it is contemplated that the recessed portion 16 may have one section 88 without departing from the teachings herein.

The first section 88 includes the offset surface 18, which is illustrated in FIG. 5 as a surface offset from the rear panel 14. The offset surface 18 may be generally parallel or non-parallel with the outer surface 96. A bottom surface 98 extends from the outer surface 96 and towards the offset surface 18. A top surface 100, opposing the bottom surface 98, extends from the second section 90 and towards the offset surface 18. In this way, the top surface 100 extends between the first and second sections 88, 90. A first region 102, 104 of each opposing side surface 92, 94 is defined between the bottom surface 98 and the top surface 100 and extends from the outer surface 96 and towards the offset surface 18.

According to various examples, the bottom surface 98, the top surface 100, and/or the first regions 102, 104 of the side surfaces 92, 94 taper towards the offset surface 18. Additionally or alternatively, the bottom surface 98, the top surface 100, and the first regions 102, 104 of the opposing side surfaces 92, 94 may define various lengths. For example, the offset surface 18 may be angled relative to the outer surface 96 such that the bottom surface 98 has a greater or lesser length than the top surface 100. As illustrated, the bottom surface 98 has a greater length than the top surface 92 due to an off-center position of the offset surface 18 between the top surface 100 and the bottom surface 98.

In further aspects, the bottom surface 98 and the top surface 100 taper towards the offset surface 18 at various angles. For example, the bottom surface 98 may taper towards the offset surface 18 at a greater angle relative to the surrounding surface (i.e., the outer surface 96) of the rear panel 14 than the top surface 100, or the top surface 100 may taper towards the offset surface 18 at a greater angle than the bottom surface 98. It is also generally contemplated that the bottom surface 98, the top surface 100, and/or the first regions 102, 104 of the opposing side surfaces 92, 94 may extend towards the offset surface 18 at varying lengths and/or angles based on the configuration of the appliance 10, the power connector 22, etc. For example, the top surface 100 may taper towards the offset surface 18 at a different angle than the bottom surface 98 due to the depth of recession of the second section 90.

Figure 6:
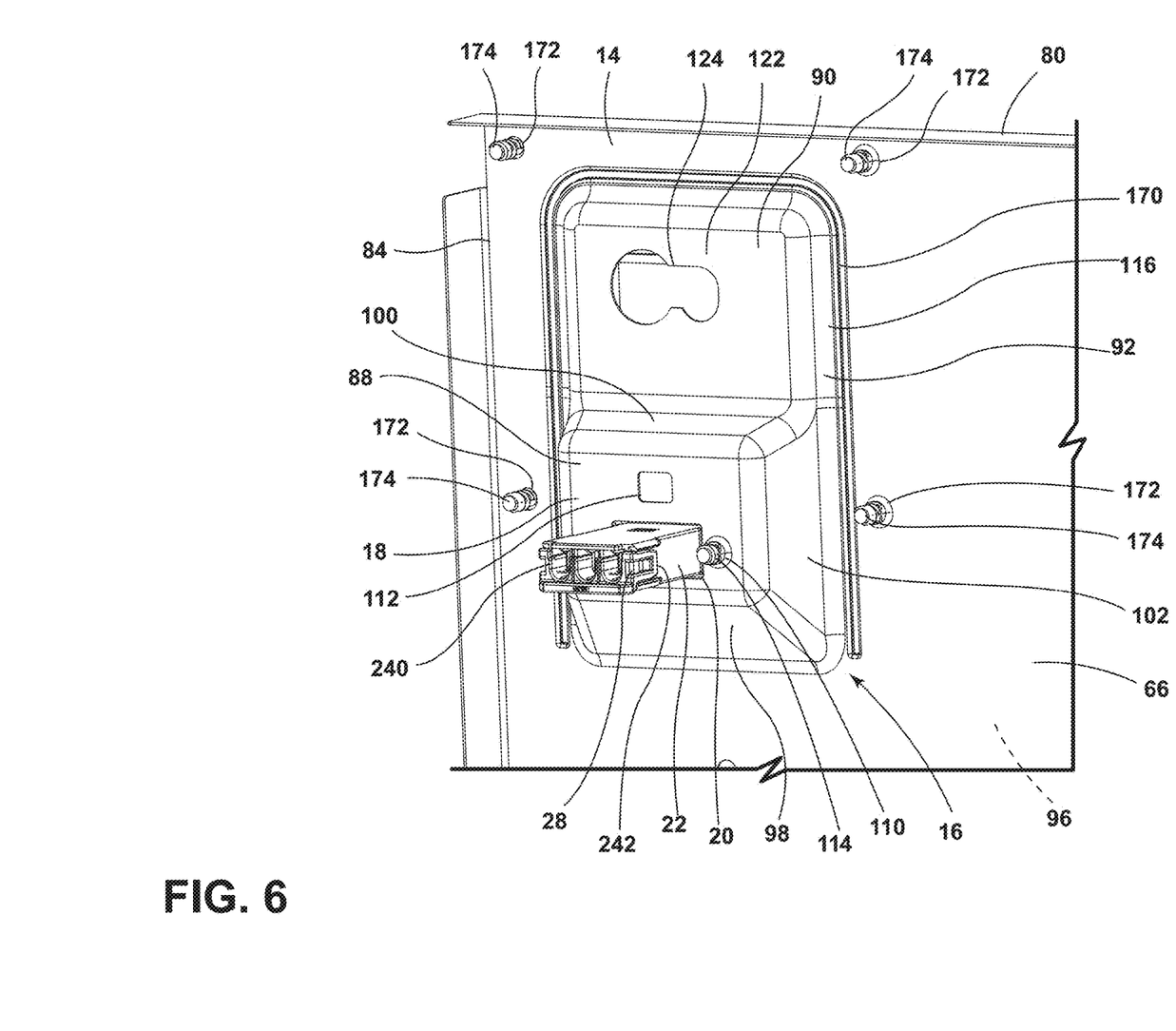
FIG. 6 is a partial side perspective view of a rear panel of an appliance with a recessed portion and a power connector disposed in an aperture defined in the recessed portion, according to the present disclosure.

As illustrated in FIGS. 4-6, one or more apertures 20, 110, 112 can be defined by the offset surface 18 of the first section 88 within the recessed portion 16. In various examples, the offset surface 18 defines the first aperture 20, a first flange apertures 110, and one or more auxiliary apertures 112. The first aperture 20 generally defines a shape that coincides with a shape of the power connector 22. For example, the first aperture 20 can generally define a quadrilateral shape that coincides with a quadrilateral shape of the power connector 22. The first aperture 20 is configured to permit the extension of at least a portion of the power connector 22 through the first aperture 20, while limiting space around the power connector 22. For example, the first aperture 20 can be defined such that the source engagement section 28 of the power connector 22 is permitted to extend through the first aperture 20 when the mounting flange 30 abuts the offset surface 18.

The first flange apertures 110 are generally a pair of apertures defined by the offset surface 18. When the power connector 22 is at least partially extending through the first aperture 20, the mounting flange 30 may abut the offset surface 18, and one or more flange fasteners 114 may extend through the mounting flange 30 and through the respective first flange aperture 110 to couple the mounting flange 30 to the offset surface 18, as provided herein. In such examples, the first flange apertures 110 can define threading that coincides with threading of one or more flange fasteners 114, as further provided herein.

In further examples, one or more auxiliary apertures 112 may be defined by the offset surface 18. One or more of the auxiliary apertures 112 may be defined such that various components may be inserted through the rear panel 14, mounted to the rear panel 14, and/or that various components may be accessible via one or more of the auxiliary apertures 112. For example, an auxiliary aperture 112 may be constructed such that one or more tabs extending from the power connector 22 extend into the auxiliary aperture 112 and engage with the offset surface 18. Additionally, or alternatively, it is also generally contemplated that the offset surface 18 and/or the first section 88 may define one or more various apertures of varying sizes.

Referring still to FIGS. 4-6, the recessed portion 16 includes the second section 90 proximate to the first section 88. In various examples, the second section 90 includes a back surface 122 recessed from the outer surface 96 of the rear panel 14. The back surface 122 is generally disposed at a depth between the outer surface 96 and the offset surface 18 of the first section 88. A second region 116, 118 of each opposing side surface 92, 94 may be defined from the outer surface 96 of the rear panel 14 to the back surface 122. In such examples, the second regions 116, 118 of each opposing side surface 92, 94 may have a depth less than the first region 102, 104 of each opposing side surface 92, 94. Further, in such examples, the top surface 100 of the first section 88 may extend from the back surface 122 and towards the offset surface 18.

According to various aspects, the back surface 122 can define one or more apertures. In the illustrated example, the back surface 122 defines a second aperture 124. The second aperture is configured to receive various components. For example, the second aperture 124 may function as a receiver mount for a transformer housing, a converter housing, and/or various other components of the appliance 10.

Figure 7:
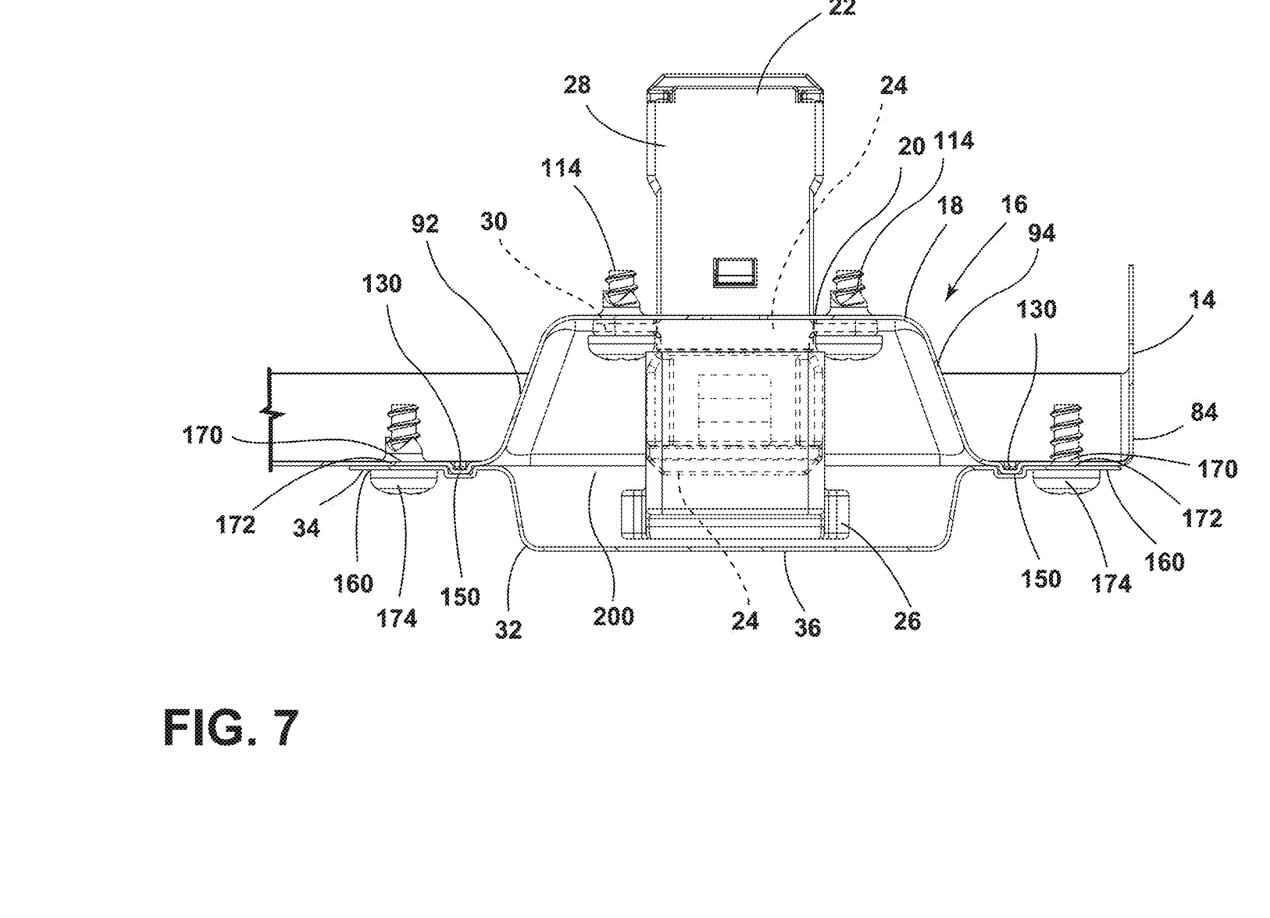
FIG. 7 is a cross-sectional view of a rear panel of an appliance with a power connector disposed in a recessed portion of the rear panel and a cover disposed over the power connector, according to the present disclosure.

Referring still to FIGS. 4-6, and now to FIG. 7, a lip 130 may be defined by the rear panel 14 and extend along an outer periphery of the recessed portion 16. In various examples, the lip 130 can be integrally formed from the rear panel 14 and be embossed relative to the rear panel 14. The lip 130 can partially extend along the outer periphery of the recessed portion 16. For example, the lip 130 generally defines a U-shape, extending along an upper peripheral edge 132 and opposing side peripheral edges 134, 136 of the recessed portion 16. In other examples, the lip 130 can extend around the recessed portion 16 along an entirety of the outer periphery.

According to various aspects, the lip 130 protrudes outward relative to the outer surface 96 of the rear panel 14.

Accordingly, the lip 130 may also be referred to as the protruding lip. The distance of protrusion of the lip 130 relative to the outer surface 96 may be at least partially determined by a channel 150 of the cover 32, as provided herein. The lip 130 is configured to operably engage with and be at least partially disposed in the channel 150 and provide a sealed interface that reduces the transmission of fluid, such as water condensation, between the lip 130 and the cover 32.

Referring again to FIGS. 2 and 3, as well as FIGS. 5-8, the cover 32 is at least partially disposed over the recessed portion 16. The cover 32 generally includes the outer rim 34, which can partially or completely extend along the upper peripheral edge 132 of the recessed portion 16 when the cover 32 is coupled to the rear panel 14. For example, the outer rim 34 generally defines a U-shape that extends along the upper peripheral edge 132 and the opposing side peripheral edges 134, 136 of the recessed portion 16. In this way, the outer rim 34 may not extend along the bottom section 40 of the cover 32. According to various aspects, an inner surface 160 of the outer rim 34 is configured abut the outer surface 96 of the rear panel 14 and/or the gasket 42 and provides a sealing interface that reduces the transmission of fluids between the cover 32 and the rear panel 14, as provided herein.

Figure 3:
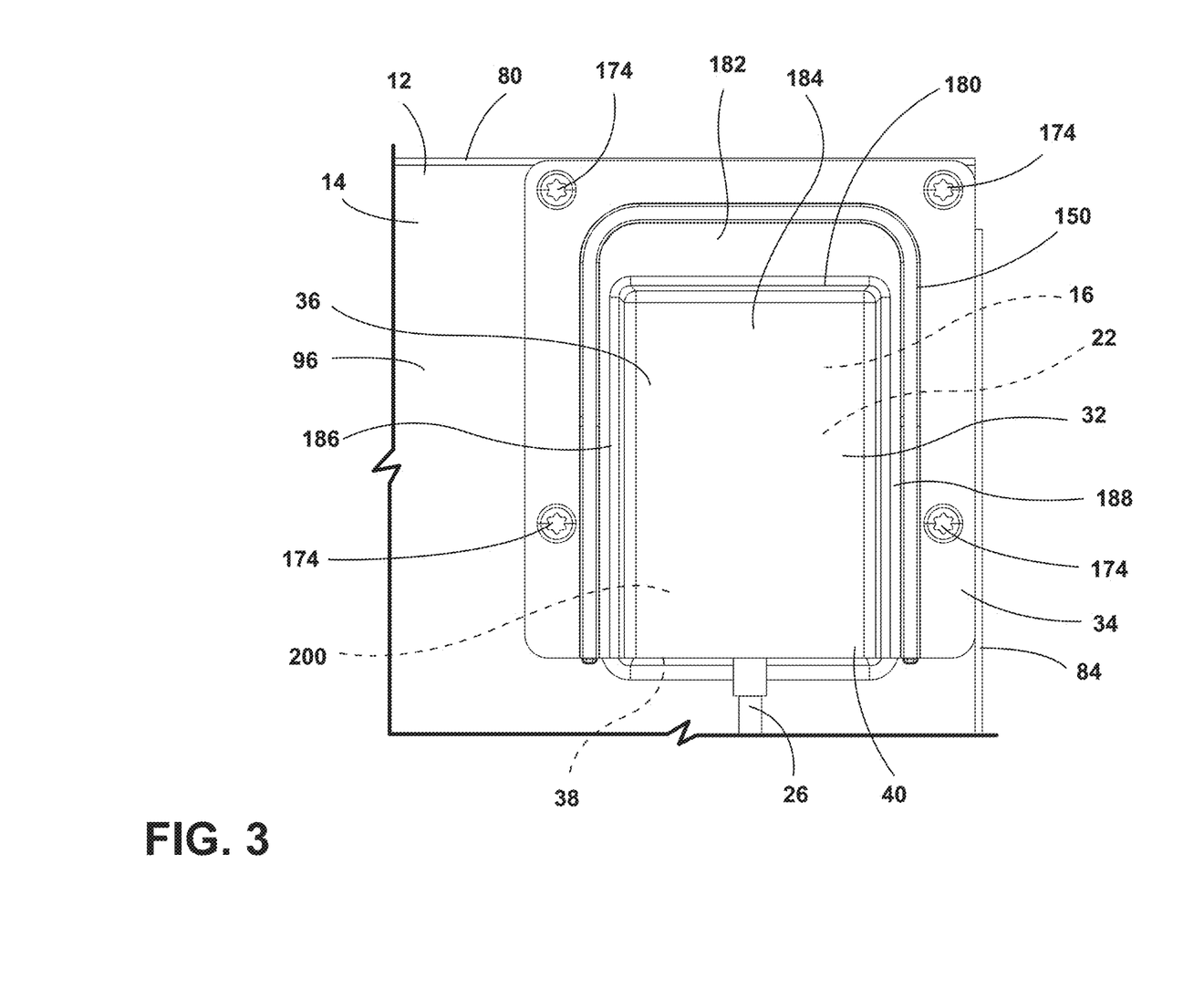
FIG. 3 is a partial enlarged, rear elevational view of a rear panel of an appliance with a recessed portion, a lip extending around the recessed portion, and a cover with a channel that is disposed over the recessed portion and engaged with the lip, according to the present disclosure.

Referring still to FIGS. 3 and 7, the outer rim 34 can define the channel 150, which is recessed relative to the inner surface 160 and protrudes outward from the rear panel 14. The degree of protrusion of the channel 150 coincides with a degree of protrusion of the lip 130. For example, the channel 150 may have a depth of protrusion such that when the channel 150 encompasses the lip 130, the outer rim 34 uniformly abuts the outer surface 96 of the rear panel 14.

Further, the channel 150 may define a width that coincides with the width of the lip 130. For example, the channel 150 may have a width greater than the lip 130 such that the channel 150 may encompass the lip 130. In other examples, the channel 150 may have a width less than the lip 130 such that the channel 150 and outer rim 34 operably deform when the channel 150 engages with the lip 130 and a snap-fit interface is defined. In such examples, the outer rim 34 can be comprised of various materials that permit operably deformation of the channel 150 as the channel 150 engages the lip 130, such as a spring steel, a fiber composite, or a flexible plastic. According to various aspects, the channel 150 is configured to at least partially encompass the lip 130, such that the lip 130 is at least partially disposed within the channel 150, to define a sealed interface that is configured to reduce or mitigate the transmission of fluid, such as water condensation, between the cover 32 and the rear panel 14. In other examples, the channel 150 is configured to at least partially engage the lip 130, such that an interference fit is defined between the channel 150 and the lip 130.

The outer rim 34 may define a plurality of rim apertures 170. The rim apertures 170 may be uniformly defined along or around the outer rim 34. In additional or alternative examples, the rim apertures 170 can be defined on opposing sides of the outer rim 34. The rim apertures 170 are configured to align with a plurality of rear panel apertures 172 defined by the rear panel 14. The rim apertures 170 may be configured to operably receive cover fasteners 174, which are configured to extend through the rim apertures 170 and engage with the rear panel 14.

In various examples, each rim aperture 170 may define threading on an inner sidewall that permits engagement of the cover fastener 174 with the respective rim aperture 170. The cover fasteners 174 are configured to apply a retaining force that at least partially couples the cover 32 to the rear panel 14 and assists in defining the sealed interface. Additionally, or alternatively, it is generally contemplated that the cover 32 can be coupled to the rear panel 14 via various fasteners or engagements, such as a snap-fit interface, an interference fit, pins, or welding, as well as the cover 32 being at least partially integrally formed with the rear panel 14 (e.g., such as with a living hinge).

The body 36 of the cover 32 protrudes outward from the outer rim 34. The body 36 includes a top wall 180 that extends from a top segment 182 of the cover 32 and towards a central section 184 of the body 36. In various examples, the top wall 180 may extend generally perpendicular from the outer rim, or the top wall 180 may angularly extend from the outer rim 34 and taper towards the central section 184. The top segment 182 extends from the outer rim 34 and towards the top wall 180. In some examples, the top segment 182 is coplanar to the outer rim 34 or may be angled relative to the outer rim 34.

According to various aspects, the height of the top segment 182 may at least partially determine placement of the body 36. For example, the top segment 182 may be of a lesser height such that the body 36 is disposed over the first section 88 and the second section 90, or the top segment 182 may be of a greater height such that top segment 182 extends over the second section 90 and the body 36 is disposed over the first section 88. In such examples, the height of the top segment 182 may be at least partially determined by various characteristics, such as the type of appliance 10, the size of the power connecter 22, the power cable 26, etc.

According to various aspects, the central section 184 of the body 36 may be generally parallel to the rear panel 14 and may generally define a flat surface. In such examples, the parallel relationship between the central section 184 and the rear panel 14 and the flat surface may assist in directing condensation downward, while also providing a flat surface that reduces an amount of protrusion of the cover 32 relative to the rear panel 14 and permits a more uniform abutment of an external wall.

In various aspects, a first sidewall 186 and a second sidewall 188 each extends from the outer rim 34 to the central section 184 of the body 36. In various examples, the first sidewall 186 and the second sidewall 188 extend outward from the outer rim 34 and are generally perpendicular to the outer rim 34. The first sidewall 186 and the second sidewall 188 may extend from the outer rim 34 such that each sidewall 186, 188 is parallel or non-parallel with the other sidewall 186, 188. In additional or alternative examples, the first sidewall 186 and the second sidewall 188 extend at an angle from the outer rim 34 and taper towards the central section 184 of the body 36. For example, the first sidewall 186 and the second sidewall 188 may each extend at an obtuse angle relative to the outer rim 34 such that each sidewall 186, 188 extends towards the other sidewall 186, 188. In such examples, the tapering of each sidewall 186, 188 may direct condensation and other fluids that may accumulate on the cover 32 towards the outer rim 34 and away from the cover 32 and the recessed portion 16.

In tapering examples, the first and second sidewalls 186, 188 generally extend at obtuse angles relative to the outer rim 32, to extend toward one another and to the central section 184. Additionally, it is generally contemplated that the degree of tapering of the first sidewall 186 and the second sidewall 188 may be of various degrees. For example, the central section 184 may be of a lesser width such that both sidewalls 186, 188 may taper to a greater degree.

According to various aspects, the body 36 and the recessed portion 16 define an interior 200 in which the power connector 22 and power cable 26 are disposed. In various examples, the length of each sidewall 186, 188, the depth of the recessed portion 16, and the top wall 180 can at least partially determine a volume of the interior 200. The length of each sidewall 186, 188 and the top wall 180, and the depth of the recessed portion 16 coincides with the shape of the power connector 22 and the power cable 26. For example, the length of each sidewall 186, 188 and the top wall 180, and the depth of the recessed portion 16 can be such that the power connector 22 and the power cable 26 can be disposed in the interior 200 and between the offset surface 18 of the recessed portion 16 and the central section 184 of the cover 32, as provided herein.

The opening 38 is defined between the bottom section 40 of the body 36 and the rear panel 14. In some examples, the opening 38 is defined as the distance between the central section 184 of the body 36 and the outer surface 96 of the rear panel 14. In other examples, the opening 38 can be defined by the distance between the central section 184 and the lip 130. In yet other examples, the opening 38 can be defined by the distance between the central section 184 and the bottom surface 98 of the recessed portion 16. In various examples, the width of the opening 38 is defined by the first sidewall 186 and the second sidewall 188. According to various aspects, the opening 38 is configured to permit the extension of the power cable 26 through the opening 38 and into the interior 200.

Figure 8:
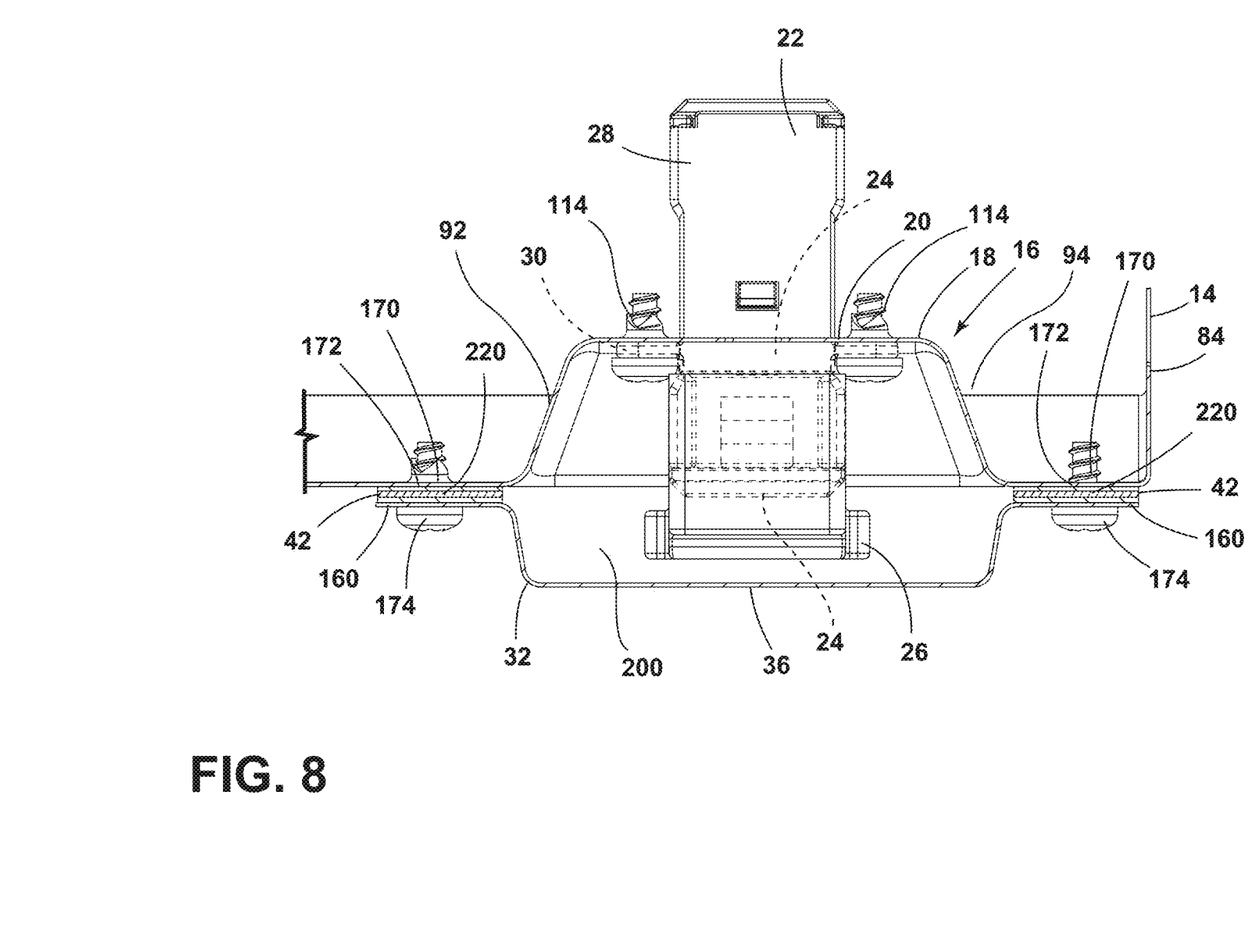
FIG. 8 is a cross-sectional view of a rear panel of an appliance with a power connector disposed in a recessed portion of the rear panel, a cover disposed over the power connector, and a gasket between the cover and the rear panel, according to the present disclosure.

Referring to FIGS. 5 and 8, the gasket 42 defines a sealed interface between the rear panel 14 and the cover 32. The gasket 42 is disposed between the rear panel 14 and the cover 32. The gasket 42 can be disposed along the outer periphery of the recessed portion 16. In various examples, the gasket 42 can partially extend along the outer periphery of the recessed portion 16. For example, the gasket 42 can define a U-shape and extend along the upper peripheral edge 132 and the opposing side peripheral edges 134, 136 of the recessed portion 16. In other examples, the gasket 42 can extend along an entirety of the outer periphery of the recessed portion 16.

According to various aspects, an overall width of the gasket 42 can correspond to an overall width of the cover 32. For example, the width of each portion of the gasket 42 generally corresponds to a width of the outer rim 34. In such examples, the outer rim 34 and the gasket 42 have a generally similar or same size and shape. The gasket 42 includes a first leg 210, a second leg 212 opposing the first leg 210, and a top segment 214 joining the first leg 210 and the second leg 212. In such examples, each leg 210, 212 and the top segment 214 can have a consistent width that corresponds to the width of the outer rim 34, as is generally illustrated in FIG. 8.

The gasket 42 can define a plurality of gasket apertures 220. The gasket apertures 220 are generally defined on the first leg 210 and the second leg 212. According to various aspects, the gasket apertures 220 are configured to align with the rim apertures 170 and/or one or more rear panel apertures 172 defined by the rear panel 14. The cover fasteners 174 are configured to extend through gasket apertures 220 and into the rear panel 14.

According to various aspects, a sealed interface can be defined between the gasket 42 and the channel 150. The channel 150 can be configured such that the width of the channel 150 permits at least partial insertion of the gasket 42 into the channel 150. For example, the outer rim 34 may be constructed such that the outer rim 34 has a width greater than the width of the gasket 42, and the channel 150 is defined with a width greater than a width of each of the first leg 210, second leg 212, and top segment 214. The gasket 42 can then be partially inserted into the channel 150 to ensure consistent placement of the gasket 42 relative to the cover 32. It is also generally contemplated that the rear panel 14 may include another embossed feature or various other features that permit alignment of the gasket 42 relative to the cover 32, or that assist in creating a sealed interface between the cover 32 and the gasket 42.

It is further contemplated, that the rear panel 14 includes the lip 140, the channel 150, and the gasket 42 to define one or more sealed interfaces between the rear panel 15 and the cover 42. For example, the lip 130 and the channel 150 may extend along an inner or an outer perimeter of the gasket 42. In another example, the gasket 42 may be disposed between the lip 130 and the channel 150. For example, the gasket 42 may be of a lesser thickness and softer durometer such that the gasket 42 may be disposed in the channel 150 and/or coupled to the lip 130, and compressed between the lip 130 and the channel 150. Accordingly, the panel-mounted system may include the lip 130 and the channel 150, the gasket 42, or both the lip 130 and the channel 150 along with the gasket 42.

As illustrated in FIG. 8, the gasket 42 is shown disposed compressed between the rear panel 14 and the outer rim 34. The gasket 42 may be constructed such that the gasket 42 at least partially deforms when a compression force is generated, such as when the cover fasteners 174 extend through the cover 32 and engage with the rear panel 14. For example, the gasket 42 may be constructed of a deformable rubber, such as a lower durometer silicone rubber, neoprene, or Ethylene Propylene Diene Monomer (EPDM). The compression of the gasket 42 against the rear panel 14 and the outer rim 34, and/or a degree of deformation of the gasket 42 provides a seal that reduces or prevents transmission of fluid between the cover 32 and the rear panel 14. The seal may reduce or prevent the transmission of various fluids, such as condensation or cooking fumes, from transmitting between the rear panel 14 and the cover 32.

Referring to FIGS. 6-8, the power connector 22 is disposed partially in the interior 200 adjacent to the recessed portion 16. For example, the power connector 22 is disposed in the interior 200 and partially extends through the first aperture 20. According to various aspects, the power connector 22 is configured to operably transfer power to the appliance 10 via a coupling with the power cable 26 and one or more power receivers that are disposed within the cabinet 12. Additionally, it is generally contemplated that the appliance 10 can include a single power connector 22 or a plurality of power connectors 22 and that the power connectors 22 may be of various sizes and configurations. It is further contemplated that the power connector 22 may be in electrical communication with various other components, such as a transformer, without departing from the teachings herein.

As illustrated in FIGS. 6-9, the power connector 22 includes the cable engagement section 24. The cable engagement section 24 is disposed in the interior 200 with a depth that extends outward from the offset surface 18 of the recessed portion 16, into the interior 200, and towards the cover 32. As illustrated in FIGS. 7 and 8, the depth of the cable engagement section 24 may be such that the cable engagement section 24 protrudes beyond the outer surface 96 of the rear panel 14 and is spaced apart from the central section 184 of the cover 32. In such aspects, the cable engagement section 24 may align with the lip 130, the channel 150, the gasket 42, or a combination thereof. According to various examples, the depth of the cable engagement section 24 may be less than the depth of the recessed portion 16. In such examples, the greater depth of the recessed portion 16 may permit at least partial insertion of the power cable 26 into the recessed portion 16. In various examples, the depth of the cable engagement section 24 and the depth of the power cable 26 are collectively less than the defined interior 200 (e.g., the distance between the offset surface 18 and the central section 184). The relationship between the cable engagement section 24, the power cable 26, and the interior 200 permits the positioning of the cover 32 over the recessed portion 16 such that the cable engagement section 24 and the power cable 26 are enclosed by the cover 32, and the power cable 26 is either spaced apart from the cover 32 or abutting the cover 32.

The cable engagement section 24 can include a first terminal block 230 configured to receive one or more pins 232 extending out of the power cable 26. In various examples, a first plurality of tab receivers 234 are defined around the terminal block 230. In such examples, the tab receivers 234 are disposed around an outer periphery of the cable engagement section 24. The tab receivers 234 are configured to engage with a plurality of tabs 236 disposed on the power cable 26 to maintain the connection between the power cable 26 and the power connector 22. According to various aspects, the first terminal block 230 may be configured with a keying feature of a polarization feature to ensure a power cord 26 of correct voltage/current is mated to the first terminal block 230. For example, the first terminal block 230 may include circuitry and or hardware, such as a blanking pin, to ensure that the power cable 26 is mated to a like cable engagement section 24.

The power connector 22 includes the source engagement section 28. As illustrated in FIG. 6, the source engagement section 28 is shown extending through the first aperture 20 and towards the front portion 60 of the cabinet 12. The source engagement section 28 extends toward one or more power receivers that are disposed within the cabinet 12. According to various aspects, the source engagement section 28 includes a second terminal block 240 configured to couple with one or more power receivers. A second plurality of tab receivers 242 can be disposed around the second terminal block 240. In some examples, the second plurality of tab receivers 242 are disposed on an outer periphery of the source engagement section 28. In such examples, each tab receiver 242 can engage with one or more tabs or one or more various other engagement elements that are disposed on one or more power receivers and maintain coupling with one or more power receivers. It is contemplated that the power connector 22 includes at least one female connection point for receiving the power cord 26, and, in various examples, two female connection points for receiving the power cord 22 and the power receiver, respectively.

Figure 9:
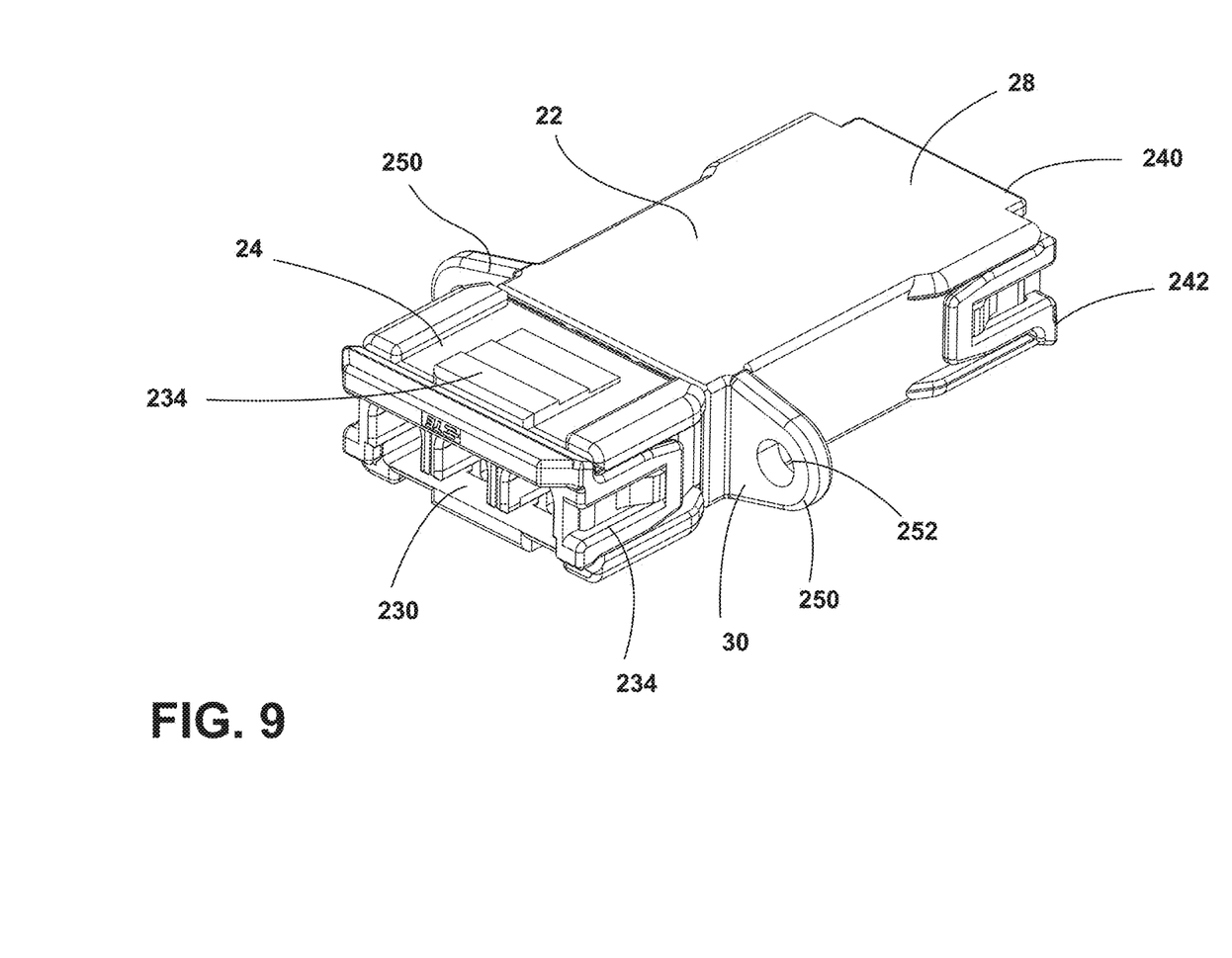
FIG. 9 is a side perspective view of a power connector of an appliance, according to the present disclosure.

Referring further to FIGS. 7-9, the power connector 22 includes the mounting flange 30. The mounting flange 30 is disposed between the cable engagement section 24 and the source engagement section 28. In some examples, the mounting flange 30 is coupled to the cable engagement section 24 and the source engagement section 28. In other examples, the mounting flange 30 can be integrally formed with the cable engagement section 24 and the source engagement section 28.

The mounting flange 30 includes a pair of wings 250 extending outward in opposing directions. In the illustrated example, the wings 250 extend towards the first side surface 92 and the second side surface 94 of the first section 88, respectively. Each of the wings 250 defines a flange aperture 252, generally forming a pair of apertures. The second flange apertures 252 align with the first pair of flange apertures 110 that are defined by the offset surface 18. In such examples, the second flange apertures 252 are configured to receive a pair of the flange fasteners 114 that are disposed in the second flange apertures 252 and extend into and through the first flange apertures 110. The flange fasteners 114 are configured to engage with the offset surface 18 and couple the mounting flange 30, and subsequently the power connector 22 to the offset surface 18.

Referring to FIGS. 1-9, the appliance 10 having the rear panel 14 with the recessed portion 16, the power connector 22 disposed partially in the space defined by the recessed portion 16 (e.g., in the interior 200), and the cover 32 disposed over the recessed portion 16 provides an accessible and protected power cable 26 and cable connector point. In particular, the location of the cable engagement section 24 of the power connector 22 being proximate to the opening 38 provides for increased accessibility in coupling and decoupling the power cable 26 from the power connector 22. By way of example, a user may be able to quickly couple and secure the power cable 26 to the power connector 22 by first decoupling the cover 32 from the rear panel 18 by removing one or more of the cover fasteners 174. The user may then insert prongs of the power cable 26 into the terminal block 240 of the cable engagement section 24 until the tabs 236 engage with the first tab receivers 234. The cover 32 may then be coupled to the rear panel 14 via the cover fasteners 174 with the power cable 26 routed out of the opening 38 of the cover 32.

Further, the power cable 26 can likewise be efficiently decoupled from the power connector 22 and removed from the appliance 10. For example, the cover 32 may be decoupled from the rear panel 14 by removing each of the cover fasteners 174. The power cable 26 can then be disconnected from the power connector 22 such that the prongs move out of the terminal block 240 and the tabs 236 disengage from the first tab receivers 234.

The placement of the cover 32 over the recessed portion 16 further provides for greater resistance to impact damage and to fluid that may enter into the recessed portion 16 and come in contact with the power connector 22 and/or the power cable 26. For example, by being disposed over the recessed portion 16 and the power connector 22, the cover 32 provides a barrier that reduces or prevents fluid, such as moisture, from flowing into the recessed portion 16 and into direct contact with the power connector 22. In particular, the sealed interfaces defined by the lip 130 and the channel 150, by the compression of the gasket 42, or the lip 130 in combination with the gasket 150, provide for a seal that reduces or eliminates fluid transmission that may occur between the rear panel 14 and the cover 32.

Use of the presently disclosed assembly may provide for a variety of advantages. For example, the use of the power connector 22 with the cable engagement section 24 that has the first plurality of tab receivers 234 and the source engagement section 28 with the second plurality of tab receivers 242 provides for reduced assembly time, as the power cable 26 can be quickly coupled and decoupled from the power connector 22 thereby maximizing the efficiency of the manufacturing process. Additionally, the placement of the cover 32 over the recessed portion 16 advantageously allows for impact protection and increased fluid protection of the recessed portion 16, the power connector 22, and the power cable 26. Further, the use of the lip 130 and the channel 150 and/or the use of the gasket 42 provides for the sealed interface that advantageously reduces or eliminates fluid transmission between the rear panel 14 and the cover 32. Further still, the lip 130 being integrally formed from the rear panel 14 and embossed relative to the rear panel 14, and the channel 150 being integrally formed from the outer rim 34, provides for a sealed interface defined by two integrally formed components, which advantageously allows for increased efficiency in manufacturing and a reduced likelihood of a fluid leak.

Use of the presently disclosed assembly may also provide for a variety of other advantages. For example, the use of a keying feature or a polarization feature on the cable engagement section 24 assists in ensuring a power cable 26 of the correct voltage/wattage is mated to the first terminal block 230 of the cable engagement section 24. Additionally, the utilization of the mounting flange 30 with accessible flange fasteners 114 permits reduced installation and removal time of the mounting flange 30 and, consequently, the power connector 22. Moreover, the assembly provided herein may be utilized in various types and configurations of appliances 10. Additional benefits or advantages of using this device may also be realized and/or achieved.

The device disclosed herein is further summarized in the following paragraphs and is further characterized by combinations of any and all of the various aspects described herein.

According to one aspect of the present disclosure, a household appliance includes a cabinet with a rear panel. The rear panel defines a recessed portion that has an offset surface and an aperture defined by the offset surface. A power connector is disposed in the aperture. The power connector includes a cable engagement section that is configured to engage a power cable. A source engagement section opposes the cable engagement section. The source engagement section extends through the rear panel to engage a power receiver within the cabinet. A mounting flange is disposed between the cable engagement section and the source engagement section. The mounting flange operably couples to the offset surface. A cover is coupled to the rear panel over the recessed portion. The cover includes an outer rim and a body protruding from the outer rim. An opening is defined between a bottom section of the body and the rear panel and permits extension of the power cable through the opening. A gasket is disposed between the rear panel and the cover. The gasket extends along at least a portion of an outer periphery of the recessed portion.

According to another aspect, a fastener is disposed in an aperture that is defined by an outer rim and extends through a rear panel, and the fastener is configured to generate a retaining force and couple a cover to a rear panel.

According to another aspect, a retaining force is configured to compress a gasket to provide a seal for reduced fluid transmission between a cover and a rear panel.

According to another aspect, a gasket defines a U-shape.

According to another aspect, a mounting flange is integrally formed with a cable engagement section and a source engagement section.

According to another aspect, a cable engagement section extends from an offset surface and into an interior defined between the offset surface and a cover, and the cable engagement section is spaced apart from the cover.

According to another aspect, a recessed portion includes a first section and a second section, and a depth of the first section is greater than a depth of the second section, and an aperture is defined in the first section.

According to another aspect, a body includes a first sidewall and a second sidewall opposing the first sidewall, and the first sidewall and the second sidewall extend at obtuse angles relative to the outer rim and toward one another.

According to another aspect, an outer rim defines a U-shape and extends along at least an upper peripheral edge of a recessed portion.

According to another aspect of the present disclosure, an appliance includes a cabinet with a rear panel. The rear panel defines a recessed portion with an aperture in the recessed portion. A protruding lip extends along at least a portion of an outer periphery of the recessed portion. A power connector is disposed in the aperture. The power connector includes a cable engagement section configured to selectively engage a power cable. A source engagement section opposes the cable engagement section. The source engagement section extends through the rear panel to engage a power receiver within the cabinet. A mounting flange is disposed between the cable engagement section and the source engagement section. The mounting flange operably couples to an offset surface of the recessed portion. A cover is coupled to the rear panel over the recessed portion. The cover has an inner surface that defines a channel. The protruding lip is disposed within the channel to provide a sealed interface between the cover and the rear panel.

According to another aspect, a mounting flange is integrally formed with a cable engagement section and a source engagement section.

According to another aspect, a mounting flange includes wings that extend outward in opposing directions.

According to another aspect, a recessed portion includes a bottom surface and a top surface opposing the bottom surface, and the bottom surface and the top surface taper towards an offset surface.

According to another aspect, a recessed portion includes a first section and a second section, and where the first section defines an aperture, and where a depth of the first section is greater than a depth of the second section, and where a cable engagement section extends from an offset surface and into an interior defined between the offset surface and a cover.

According to yet another aspect of the present disclosure, an appliance includes a cabinet panel. The cabinet panel defines a recessed portion and an aperture in the recessed portion. A power connector is disposed in the aperture. The power connector includes a cable engagement section that is configured to engage a power cable. A source engagement section opposes the cable engagement section. The source engagement section extends through the cabinet panel to engage a power receiver within the cabinet. A mounting flange is disposed between the cable engagement section and the source engagement section. The mounting flange is operably coupled to an offset surface of the recessed portion. A cover is coupled to the rear panel over the recessed portion.

According to another aspect, a cover includes an outer rim and a body protruding from the outer rim, and the outer rim defines a U-shape that extends along at least an upper peripheral edge of a recessed portion.

According to another aspect, a recessed portion includes a bottom surface and a top surface opposing the bottom surface, and the bottom surface and the top surface taper towards the offset surface, and the bottom surface extends at a greater angle relative to the offset surface than the top surface.

According to another aspect, a sealed interface is defined between an inner surface of a cover and a cabinet panel.

According to another aspect, a gasket is disposed between a cabinet panel and a cover to at least partially define a sealed interface.

According to another aspect, a cover includes an inner surface that defines a channel, and a cabinet panel defines a protruding lip that extends along at least a portion of an outer periphery of a recessed portion, and where the protruding lip is disposed within the channel to define a sealed interface.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A household appliance, comprising:
    a cabinet including a rear panel, the rear panel defining a recessed portion with an offset surface and an aperture defined by the offset surface;
    a power connector disposed in the aperture defined by the offset surface of the recessed portion, the power connector including:
        a cable engagement section configured to engage a power cable;
        a source engagement section opposing the cable engagement section, the source engagement section extending through the rear panel to engage a power receiver within the cabinet; and
        a mounting flange disposed between the cable engagement section and the source engagement section, the mounting flange operably coupled to the offset surface;
    a cover coupled to the rear panel over the recessed portion, the cover including an outer rim and a body protruding outward from the outer rim, wherein an opening is defined between a bottom section of the body and the rear panel through which the power cable is configured to extend; and
    a gasket disposed between the rear panel and the cover, wherein the gasket extends along at least a portion of an outer periphery of the recessed portion.

2. The household appliance of claim 1, further comprising:
    a fastener disposed in an aperture defined by the outer rim and extending through the rear panel, wherein the fastener is configured to generate a retaining force and couple the cover to the rear panel.

3. The household appliance of claim 2, wherein the retaining force is configured to compress the gasket to provide a seal for reducing fluid transmission between the cover and the rear panel.

4. The household appliance of claim 1, wherein the gasket defines a U-shape.

5. The household appliance of claim 1, wherein the mounting flange is integrally formed with the cable engagement section and the source engagement section.

6. The household appliance of claim 1, wherein the cable engagement section extends from the offset surface and into an interior defined between the offset surface and the cover, and wherein the cable engagement section is spaced apart from the cover.

7. The household appliance of claim 1, wherein the recessed portion includes a first section and a second section, and wherein a depth of the first section is greater than a depth of the second section, and wherein the aperture is defined in the first section.

8. The household appliance of claim 1, wherein the body includes a first sidewall and a second sidewall opposing the first sidewall, and wherein each of the first sidewall and the second sidewall extend at an obtuse angle relative to the outer rim and toward one another.

9. The household appliance of claim 1, wherein the outer rim defines a U-shape and extends along at least an upper peripheral edge of the recessed portion.

10. An appliance, comprising:
    a cabinet including a rear panel, the rear panel defining a recessed portion, an aperture in the recessed portion, and a protruding lip extending along at least a portion of an outer periphery of the recessed portion;
    a power connector disposed in the aperture defined in the recessed portion of the rear panel, the power connector including:
        a cable engagement section configured to selectively engage a power cable;
        a source engagement section opposing the cable engagement section, the source engagement section extending through the rear panel to engage a power receiver within the cabinet; and a mounting flange disposed between the cable engagement section and the source engagement section, the mounting flange operably coupled to an offset surface of the recessed portion; and a cover coupled to the rear panel over the recessed portion, the cover having an inner surface defining a channel, wherein the protruding lip is disposed within the channel to provide a sealed interface between the cover and the rear panel.

11. The appliance of claim 10, wherein the mounting flange is integrally formed with the cable engagement section and the source engagement section.

12. The appliance of claim 10, wherein the mounting flange includes wings extending outward in opposing directions.

13. The appliance of claim 10, wherein the recessed portion includes a bottom surface and a top surface opposing the bottom surface, and wherein the bottom surface and the top surface taper towards the offset surface.

14. The appliance of claim 13, wherein the recessed portion includes a first section and a second section, the first section defining the aperture, and wherein a depth of the first section is greater than a depth of the second section, and further wherein the cable engagement section extends from the offset surface and into an interior defined between the offset surface and the cover.

15. An appliance, comprising:
a cabinet panel, the cabinet panel defining a recessed portion and an aperture in the recessed portion;
a power connector disposed in the aperture defined in the recessed portion of the cabinet panel, the power connector including:
a cable engagement section configured to engage a power cable;
a source engagement section opposing the cable engagement section, the source engagement section extending through the cabinet panel to engage a power receiver within a cabinet; and
a mounting flange disposed between the cable engagement section and the source engagement section, the mounting flange operably coupled to an offset surface of the recessed portion; and
a cover coupled to the cabinet panel over the recessed portion.

16. The appliance of claim 15, wherein the cover includes an outer rim and a body protruding from the outer rim, and wherein the outer rim defines a U-shape extending along at least an upper peripheral edge of the recessed portion.

17. The appliance of claim 15, wherein the recessed portion includes a bottom surface and a top surface opposing the bottom surface, and wherein the bottom surface and the top surface taper towards the offset surface, and wherein the bottom surface extends at a greater angle relative to the offset surface than the top surface.

18. The appliance of claim 15, wherein a sealed interface is defined between an inner surface of the cover and the cabinet panel.

19. The appliance of claim 18, further comprising:
a gasket disposed between the cabinet panel and the cover to at least partially define the sealed interface.

20. The appliance of claim 18, wherein the cover includes an inner surface defining a channel, and wherein the cabinet panel defines a protruding lip extending along at least a portion of an outer periphery of the recessed portion, and further wherein the protruding lip is disposed within the channel to define the sealed interface.

* * * * *